(12) United States Patent
Heinrichs

(10) Patent No.: US 11,698,093 B2
(45) Date of Patent: Jul. 11, 2023

(54) BLIND RIVET

(71) Applicant: BÖLLHOFF VERBINDUNGSTECHNIK GmbH, Bielefeld (DE)

(72) Inventor: Heinrich Heinrichs, Vlotho (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 543 days.

(21) Appl. No.: 16/961,272

(22) PCT Filed: Dec. 11, 2018

(86) PCT No.: PCT/EP2018/084418
§ 371 (c)(1),
(2) Date: Jul. 10, 2020

(87) PCT Pub. No.: WO2019/137722
PCT Pub. Date: Jul. 18, 2019

(65) Prior Publication Data
US 2021/0062849 A1 Mar. 4, 2021

(30) Foreign Application Priority Data
Jan. 10, 2018 (DE) .......................... 102018100470.2

(51) Int. Cl.
F16B 19/10 (2006.01)
F16B 37/06 (2006.01)
F16B 43/00 (2006.01)

(52) U.S. Cl.
CPC ........ F16B 19/1072 (2013.01); F16B 37/067 (2013.01); F16B 43/00 (2013.01); F16B 19/10 (2013.01)

(58) Field of Classification Search
CPC .......... F16B 5/04; F16B 21/00; F16B 21/086; F16B 19/00; F16B 19/04; F16B 19/10; F16B 19/109; F16B 19/1072; F16B 19/1081; F16B 37/067; F16B 43/00
USPC .......................... 411/15, 500, 501, 508–510
See application file for complete search history.

(56) References Cited

U.S. PATENT DOCUMENTS

| | | | |
|---|---|---|---|
| 3,030,850 A | * | 4/1962 | Minor ...................... B21J 15/04 403/368 |
| 3,267,793 A | | 8/1966 | Devine et al. |
| 5,074,726 A | | 12/1991 | Betchel et al. |
| 7,040,006 B2 | | 5/2006 | Mauer et al. |

(Continued)

FOREIGN PATENT DOCUMENTS

| | | |
|---|---|---|
| AT | 188489 B | 1/1957 |
| CN | 105570266 A | 5/2016 |

(Continued)

OTHER PUBLICATIONS

Written Opinion & International Search Report for PCT/EP2018/084418 dated Apr. 16, 2019, 11 pages.

(Continued)

Primary Examiner — Roberta S Delisle
(74) Attorney, Agent, or Firm — Reising Ethington P.C.

(57) ABSTRACT

A blind rivet for establishing a screw connection between a support component and a fastening part has an elastic outer body and a metal bushing arranged therein. The outer body is at least partially surrounded by a fixing sleeve which fixes the outer body on an end portion in the metal bushing.

17 Claims, 10 Drawing Sheets

(56) References Cited

U.S. PATENT DOCUMENTS

Figure 1:
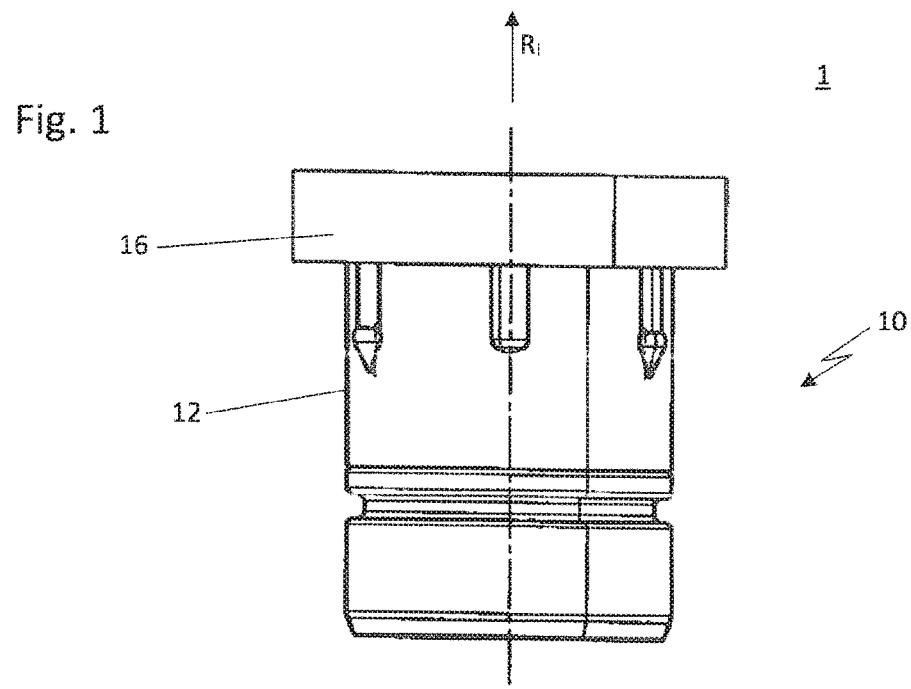

| | | |
|---|---|---|
| 7,393,169 B2 | 7/2008 | Süßenbach |
| 7,596,858 B2 | 10/2009 | Opper |
| RE41,258 E | 4/2010 | Mauer et al. |
| 2007/0274801 A1 | 11/2007 | Kidman |
| 2010/0172713 A1* | 7/2010 | Benson ................ F16B 13/066 411/35 |
| 2012/0230796 A1* | 9/2012 | McClure ............... F16B 19/109 411/80.1 |
| 2016/0121937 A1 | 5/2016 | Forsyth |
| 2018/0038406 A1 | 2/2018 | Makino et al. |
| 2019/0154073 A1 | 5/2019 | Figge et al. |

FOREIGN PATENT DOCUMENTS

| | | |
|---|---|---|
| CN | 107532634 A | 1/2018 |
| DE | 2213711 A1 | 11/1972 |
| DE | 9001069 U1 | 4/1990 |
| EP | 1710454 B1 | 9/2007 |
| GB | 1337688 A | 11/1973 |
| GB | 2240603 A | 8/1991 |
| WO | WO02073045 A3 | 9/2002 |
| WO | WO2018001710 A1 | 1/2018 |

OTHER PUBLICATIONS

CN Office Action for CN Application No. 201880086151.X dated Apr. 27, 2021 (8 pages).

Mechanical Properties of Fasteners Made of Carbon Steel and Alloy Steel; Part 1: Bolts, Screws and Studs; DIN EN ISO 898-1:2013-05; Jan. 14, 2013; 64 pages.

English translation of the International Preliminary Report on Patentability for PCT/EP2018/084418 dated Jul. 14, 2020, 6 pages.

* cited by examiner

Fig. 5
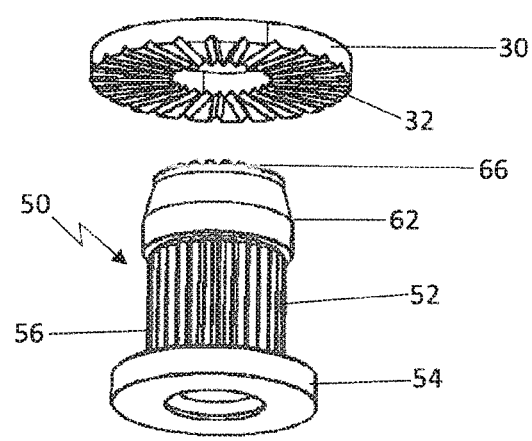
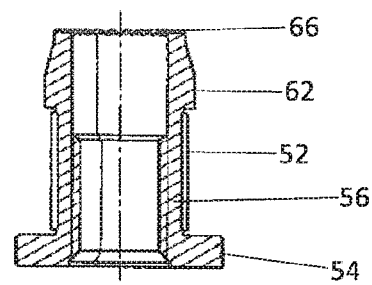
Fig. 6

BLIND RIVET

TECHNICAL FIELD

The present disclosure relates to a blind rivet for a screw connection between a support component and a fastening part, a connection with this blind rivet, a manufacturing method for this blind rivet as well as a connecting method for connecting the support component and fastening part by means of a blind rivet.

BACKGROUND

From DE GM 90 01 069.8 a blind rivet nut is known, which comprises an elastic outer body and a metal threaded insert. The elastic outer body has a sleeve-shaped shaft which is insertable into a fastening hole of the support part and has a fastening flange and a folding zone which is foldable to form an upsetting bulge forming a closing head, so that the blind rivet nut is fixed to the fastening part by the fastening flange on the one hand and by the upsetting bulge on the other hand. In the case of the previously known blind rivet nut, the threaded bushing is divided into a threaded element and a spacer sleeve, wherein the spacer sleeve abuts against the underside of the fastening part at the end of the folding process. There are also known embodiments in which the threaded bushing is formed in one piece.

In any case, the axial force required for the folding process is transferred from the fastening screw via the metal threaded bushing directly to the fastening part, without the upsetting bulge eventually having to absorb the axial force. The aforementioned blind rivet nut is, however, subject to certain strength restrictions. If, for example, the blind rivet nut is to be designed for a screw connection with a high-strength screw of a strength class of more than 8.8 (in accordance with DIN-JSO 898 Part 1), there is a risk of unacceptable twisting of the elastic outer body and of an excessive surface pressure between the end face of the threaded bushing and the underside of the fastening part.

EP 1 710 454 B1 discloses a blind rivet for a screw connection between a support component and a fastening part. This blind rivet consists of an elastic outer body with a sleeve-shaped shaft which is insertable into a fastening hole of the support part and comprises a fastening flange and a folding zone which is foldable into an upsetting bulge, wherein the fastening flange and the upsetting bulge are supportable on opposite sides of the support part. In addition, the blind rivet comprises a metal bushing which is arranged inside the outer body. The outer body, for example made of a thermo-plastic elastomer, is injection molded to surround the bushing. During this process, an anchoring projection of the outer body is created, which engages in a ring-shaped indentation of the anchoring section of the bushing. In this way, the outer body and the bushing arranged inside form a form-fit or positive connection. If the blind rivet is axially compressed within a screw connection, the folding bulge forms in the folding zone.

Here it is a disadvantage if the outer body is not sufficiently axially fixed so that it comes off the bushing. It has also been shown to be a disadvantage that not all materials that are advantageous for certain environmental conditions can be processed into an outer body using the injection molding method. Even if they can be processed advantageously, the appropriate adhesive forces between the inner bushing and the surrounding outer body are not always achieved. Accordingly, the blind rivet does not form a stressable unit, which can result in poor damping properties or an unfavorable loosening of an established connection.

It is therefore an object of at least some implementations of the present invention to provide a blind rivet which, due to its construction, supports a connection in a stable and reliable manner even under the most diverse environmental effects and in the most diverse material combinations.

SUMMARY

The above object is solved by a blind rivet, by a connection method for a screw connection between a support component and a fastening part by means of the blind rivet, by a correspondingly manufactured connection, and by manufacturing methods for such a blind rivet. Further designs and further developments of the present disclosure arise from the following description, the accompanying drawings and the appending claims.

The blind rivet for a screw connection comprises the following features: an elastic outer body with a sleeve-shaped shaft which comprises a fastening flange and a hollow cylindrical folding zone which is foldable to an upsetting bulge, so that a support component is supportable between the fastening flange and the upsetting bulge, a metal bushing which is arranged within the outer body and which comprises a support section arranged in the portion of the folding zone, which is longitudinally displaceable relative to the outer body and is axially limited at an axial end facing away from the support section by a ring-shaped retaining flange which covers a radial expansion of the outer body, and a fixing sleeve surrounding the outer body, which is arranged adjacent to the retaining flange of the bushing, extends axially in the direction of the fastening flange and limits a radial expansion of the outer body outside the folding zone as well as between bushing and fixing sleeve to at most the radial expansion of the retaining flange of the bushing.

The blind rivet for the screw connection between, for example, a support component and a fastening part produces a vibration-damping arrangement or fastening of the above-mentioned components to each other due to the elastic outer body. Due to its construction, this blind rivet is distinguished by a variable use of elastic materials for the manufacturing of the outer body. This is because, regardless of the choice of material for the outer body, the latter is held between the inner metal bushing and a fixing sleeve surrounding the outer body close to the ring-shaped retaining flange of the bushing. This retaining function with the aid of the fixing sleeve is locally limited to a portion of the blind rivet which does precisely not provide the vibration-damping upsetting bulge. While the elastic outer body can therefore fold freely in the portion of the hollow cylindrical folding zone and abut against the support component, the combination of fixing sleeve, inner metal bushing and retaining flange of the bushing, which is facing away from it, ensures that the outer body is reliably fastened in the blind rivet construction.

According to a further embodiment, the retaining flange of the bushing completely covers the radial expansion of the outer body. By means of this constructive design, the retaining flange forms a maximum axial undercut for the outer body. This undercut ensures that the outer body cannot slide over the retaining flange despite the mechanical loads within the connection. This also ensures that the vibration-damping upsetting bulge remains adjacent to the support component.

According to a further embodiment, an axial length of the fixing sleeve limits an axial length of the folding zone without supporting the folding zone by tapering a wall thickness of the outer body. In particular, this means that the fixing sleeve covers a fastening portion in which the outer body is held between the fixing sleeve and the metal bushing. In addition, the fixing sleeve forms a stabilizing limitation up to which the foldable hollow cylindrical folding zone can transform or reshape into an upsetting bulge. Due to this stiffening limitation with the aid of the fixing sleeve, it is not necessary to reduce a radial wall thickness of the outer body in order to create a selective buckling of the outer body in the foldable hollow cylindrical folding zone. This is because such a material tapering at the same time means a weakening of the outer body. This could, for example, lead to a failure of the material of the outer body and to a reduction of the damping functions associated with this.

It may also be preferred that the outer body comprises a fastening flange which provides a receiving space for a distributor disc. According to a further embodiment, in the fastening flange the distributor disc is held in a loss-proof manner, which may have a knurling on a side facing the bushing.

The metal bushing is arranged inside the elastic outer body. When a connection is established by means of the blind rivet, the metal bushing is displaced in the direction of the support component while the upsetting bulge is formed. It is advantageous that the axial end of the metal bushing facing the support component is in abutment with the fastening part within the established connection. In order to be able to distribute the mechanical loads applied by the metal bushing optimally to the fastening part, the distributor disc is provided in the fastening flange of the elastic outer body. This distributor disc may be made of metal and transmits the axial forces absorbed by the metal bushing to the fastening part. A metal-to-metal connection between the metal bushing and the fastening part may be realized by means of the load-transmitting distributor disc. In this way, it is avoided that the connection is weakened by, for example, material relaxation.

It may also be preferred that the bushing comprises a conical end section which faces the fastening flange and provides an axial support face and an axial undercut. In this context, the axial support face comprises, according to a further embodiment, a knurling as an anti-rotation protection.

By means of the shape of the inner metal bushing, various functions are realized. With the aid of the conically shaped end section, it is possible to overmold the metal bushing not only with an elastic material of the outer body. Rather, in addition to an injection molding or other forming method, it is also possible to insert or slide the metal bushing into a preformed elastic outer body. Here, the conical end section serves as an insertion aid, which supports the exact positioning of the metal bushing inside the elastic outer body. Despite this conical shape of the end section, it has an axial support face which, within the established connection, may abut against the above-mentioned distributor disc. Thus the conical end section also has a load-transferring effect alone or in combination with the distributor disc. If the axial support face has a knurling, then this knurling additionally provides rotation inhibition between the distributor disc and the bushing, for example when producing the connection by means of a blind rivet. In addition, the conical shape of the end section may be used to provide an axial undercut in its shape. This interacts with an inner side of the elastic outer body. This axial undercut may prevent an axial displacement of the metal sleeve against the installation direction or fastening direction out of the elastic outer body. In this way, the conical end section also realizes with its axial undercut a securing or additional hold of the metal bushing inside the elastic outer body.

According to a further embodiment, the fixing sleeve comprises a circumferential indentation which supports a positive fit or form-fit between the outer body and the bushing. In addition, it may be preferred that the metal bushing inside the outer body comprises an anti-rotation protection on a radial outer side in the form of longitudinal knurls which are arranged outside the folding zone.

Outside the folding zone, the arrangement of the surrounding fixing sleeve may ensure that the elastic outer body with its radial inner side abuts against the radial outer side of the metal bushing. Since the radial outer side of the metal bushing is distinguished by the longitudinal knurling, a forming positive fit or form-fit ensures additional anti-rotation protection due to the abutting elastic material of the outer body on the radial outer side of the metal bushing. This supports the integrity of the blind rivet.

It may be further preferred to have webs distributed around the circumference below the fastening flange of the outer body for firmly clamping the outer body in a bore or hole of a support component. It may also be preferred that the bushing is formed as a threaded bushing with an inner thread for receiving a fastening screw, so that the blind rivet serves as a blind rivet nut. Further it may be preferred that the metal bushing inside the elastic outer body is formed threadless.

According to further embodiments, the outer body is made of an elastomer or a thermoplastic elastomer, such as on a polyester basis, or of a cross-linked elastomer. Depending on the application, materials with good chemical resistance and/or thermal stability, for example, are selected from this range of materials. The polyester-based elastomer may be a polybutylene terephthalate (PBT) or polyethylene terephthalate (PET). Further non-exhaustive examples of elastomers are ethylene-propylene-diene rubber (EPDH), acrylonitrile-butadiene rubber (NBR), silicone rubber (VMQ) and chemically chlorosulfonated polyethylene (CSM). The elastic outer body may be made of silicone or a similar chemically and thermally resistant material.

The present disclosure also includes a connection method for a screw connection between a support component and a fastening part. This connection method comprises the following steps: inserting the blind rivet according to one of the above-described embodiments into a bore in the support component, arranging the fastening part with an opening adjacent to the fastening flange of the outer body and screwing a fastening screw into the blind rivet, wherein the outer body is folded in a folding zone in such a manner that the fastening flange and a folding bulge are supported on opposite sides of the support component when the support component and the fastening component are fastened to each other.

It may be preferred in the connection method that the fastening screw is screwed into an inner thread of the bushing of the blind rivet or into another female threaded element.

In addition, the present disclosure comprises a connection between a support component and a fastening part which are fastened to each other by means of a screw connection using a blind rivet according to one of the above-described embodiments.

A manufacturing method for the blind rivet is also disclosed, which comprises the following steps: providing a metal bushing with a ring-shaped retaining flange, inserting the bushing into an elastic outer body with a sleeve-shaped shaft comprising a fastening flange and a hollow-cylindrical folding zone foldable to an upsetting bulge, and providing a fixing sleeve surrounding the outer body adjacent to the retaining flange of the bushing and extending axially in the direction of the fastening flange.

The manufacturing method may be realized according to three different manufacturing alternatives, as explained in more detail below. A first alternative is to provide an already preformed elastic outer body with the metal bushing, i.e. to insert the metal bushing into a central opening of the outer body. Accordingly, the metal bushing is arranged coaxially to the outer body. The fixing sleeve is provided on the radial outer side of the outer body. Accordingly, the outer body is arranged between the fixing sleeve and the metal bushing.

According to different embodiments of this manufacturing alternative, the fixing sleeve is arranged on the outer body before or after the bushing has been inserted into the outer body. It follows from these different embodiments of this manufacturing alternative that the fixing sleeve is first arranged on the outer body. Subsequently, the metal bushing is then inserted into the outer body with fixing sleeve. In an alternative manufacturing route, it may also be preferred to initially insert the metal bushing into the outer body. Afterwards the fixing sleeve is plugged onto this assembly of outer body and metal bushing.

The present manufacturing method may also comprise the arrangement of a washer in the fastening flange of the outer body. According to the above description, this washer serves for load distribution when the metal bushing is pressed against the support component via the washer within the established connection.

According to a further alternative of the manufacturing method for the blind rivet, the following method steps are provided: arranging the fixing sleeve in an injection mold which defines a shape of the elastic outer body with the sleeve-shaped shaft, wherein the sleeve-shaped shaft comprises the fastening flange and the hollow-cylindrical folding zone which is foldable to an upsetting bulge; injection molding the elastic outer body with the sleeve-shaped shaft into the fixing sleeve and inserting a metal bushing with a ring-shaped retaining flange into the outer body with fixing sleeve in such a manner that the fixing sleeve surrounds the outer body adjacent to the retaining flange of the bushing.

According to this further manufacturing alternative, the fixing sleeve may be initially arranged in the injection mold. Subsequently, the elastic outer body is then injection molded into the fixing sleeve, so that the combination of fixing sleeve and elastic outer body results. Here, it is understood that the inside of the elastic outer body is kept free by a mandrel or a similar construction. After the combination of elastic outer body and fixing sleeve has been produced, it may be demolded from the injection mold. Only after the combination of outer body and fixing sleeve has been demolded the metal bushing is inserted into the outer body. Finally, the washer may be arranged in the fastening flange of the outer body in order to ensure the abovementioned functionality of load transfer via the washer.

A further alternative of the manufacturing method for the blind rivet comprises the following steps: coaxially arranging the fixing sleeve and the metal bushing with the ring-shaped retaining flange in an injection mold which defines a shape of the elastic outer body with a sleeve-shaped shaft, wherein the sleeve-shaped shaft comprises the fastening flange and the hollow-cylindrical folding zone which is foldable into an upsetting bulge; injecting the elastic outer body with the sleeve-shaped shaft between the fixing sleeve and the metal bushing so that the fixing sleeve surrounds the outer body adjacent to the retaining flange of the bushing.

In a modified manufacturing alternative, the metal bushing is arranged within the injection mold in addition to the fixing sleeve. This procedure has the practical advantage that fewer manufacturing steps are required for the manufacturing of the blind rivet. This is because the elastic outer body is injected between the fixing sleeve and the metal bushing in the injection mold, so that a combination of fixing sleeve, outer body and bushing results. Since, the elastic outer body may be predefined by the injection mold with its constructive features already described in detail above, after the injection molding process, the outer body with fastening flange is present. Accordingly, after the outer body has been demolded from the injection mold, it may be intended to arrange the washer already described above in the fastening flange for later load transfer in the connection.

BRIEF DESCRIPTION OF THE ACCOMPANYING DRAWINGS

Figure 2:
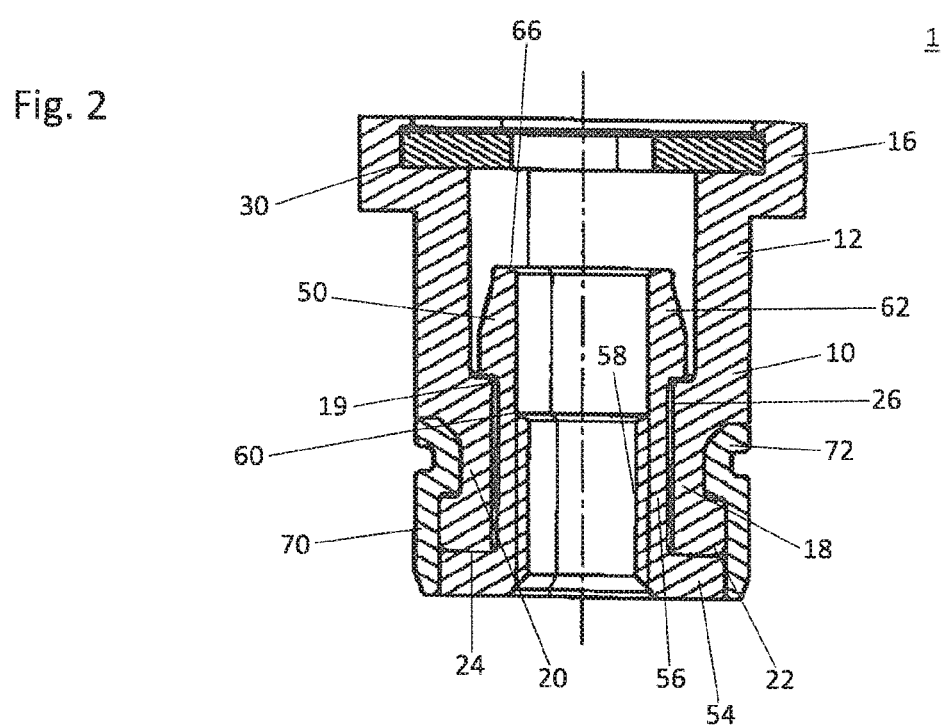
Figure 3:
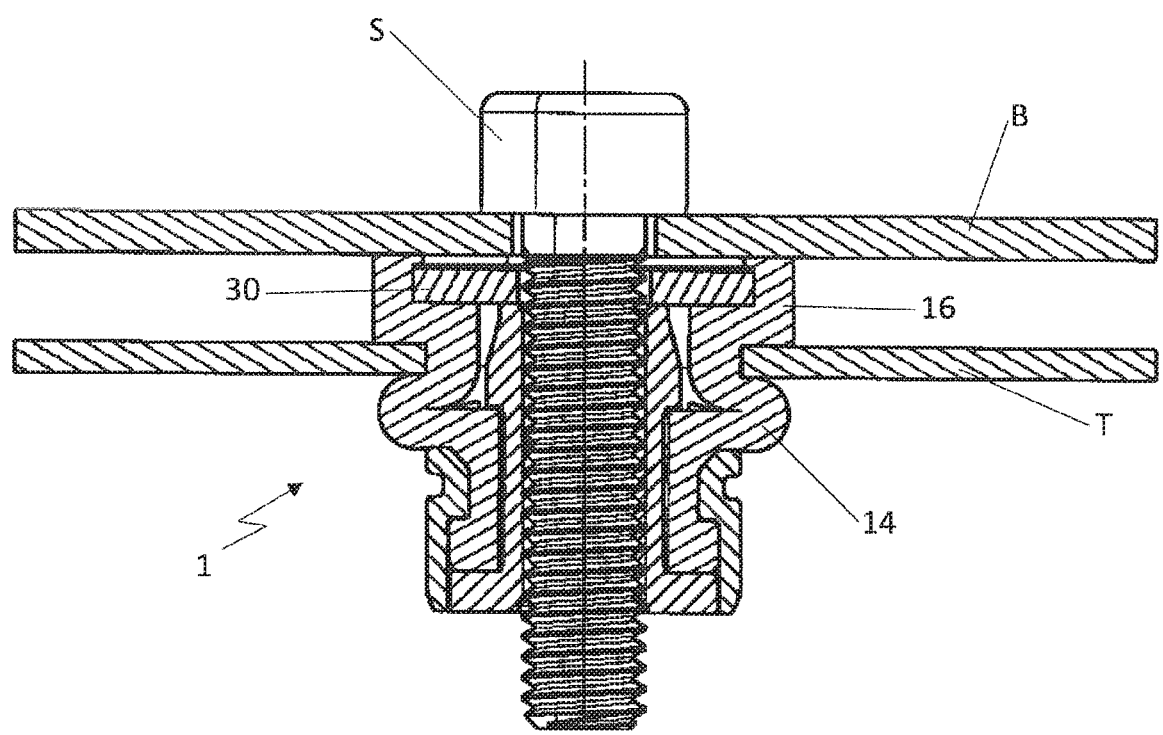
Figure 4:
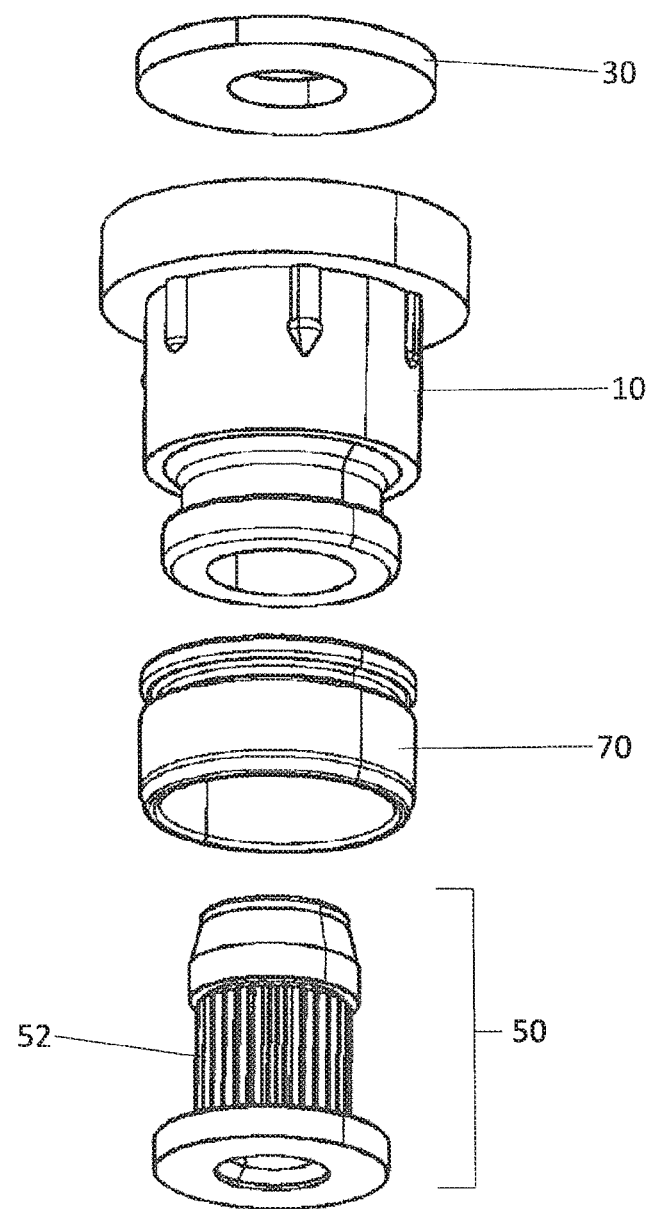
Figure 7:
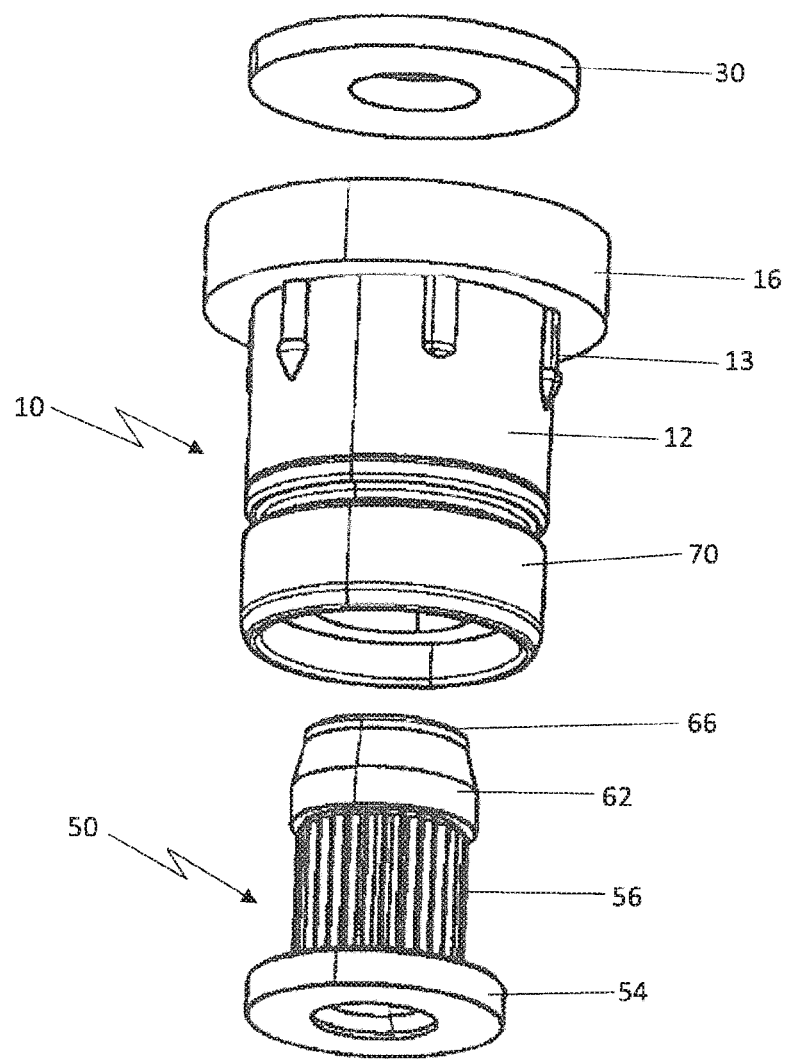
Figure 8:
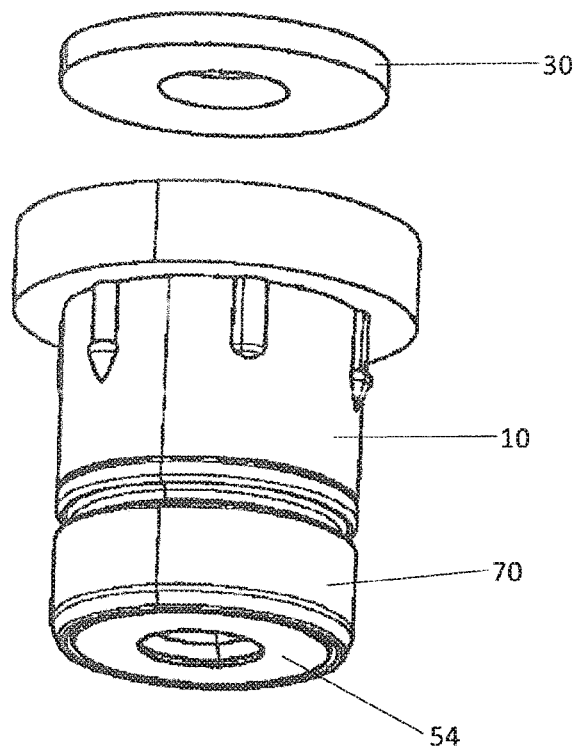
Figure 9:
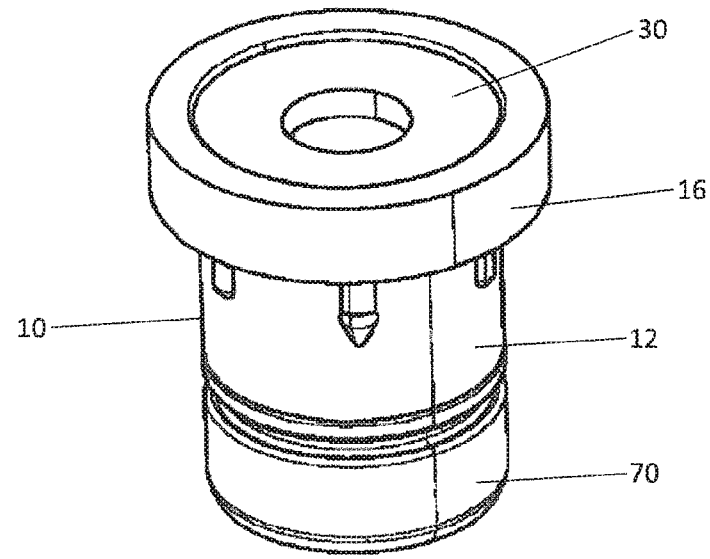
Figure 10:
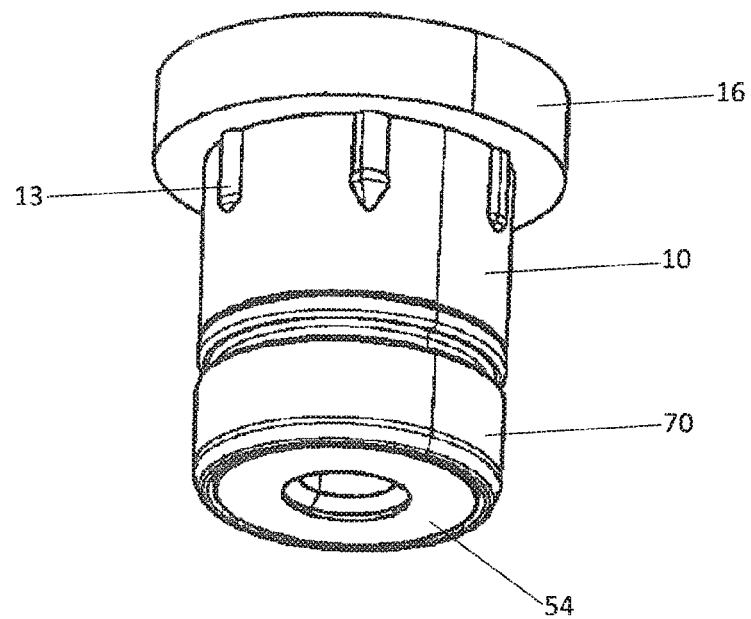
Figure 11D:
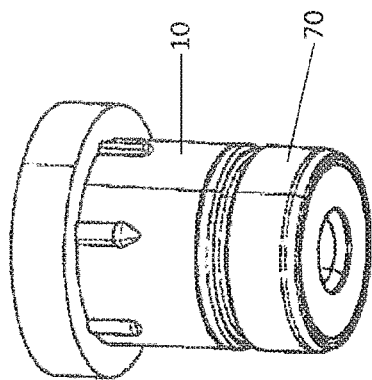
Figure 11C:
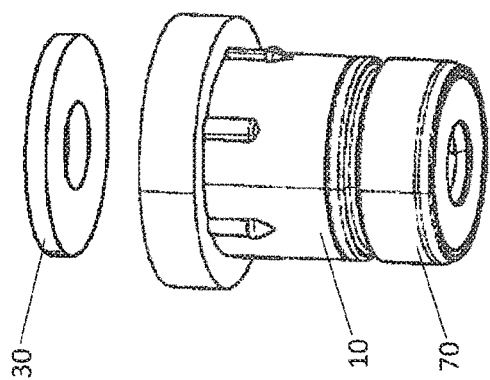
Figure 11B:
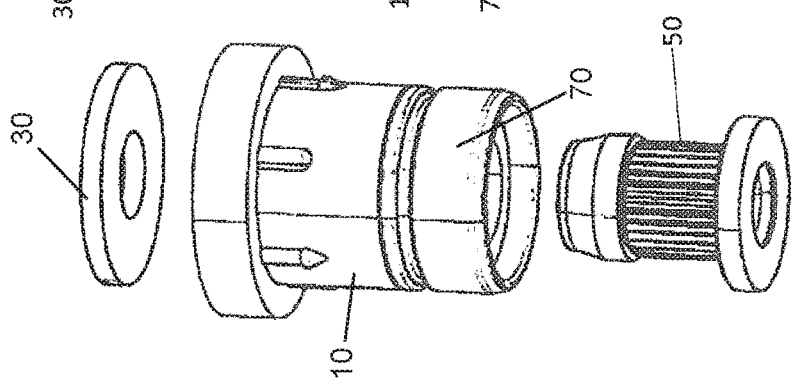
Figure 11A:
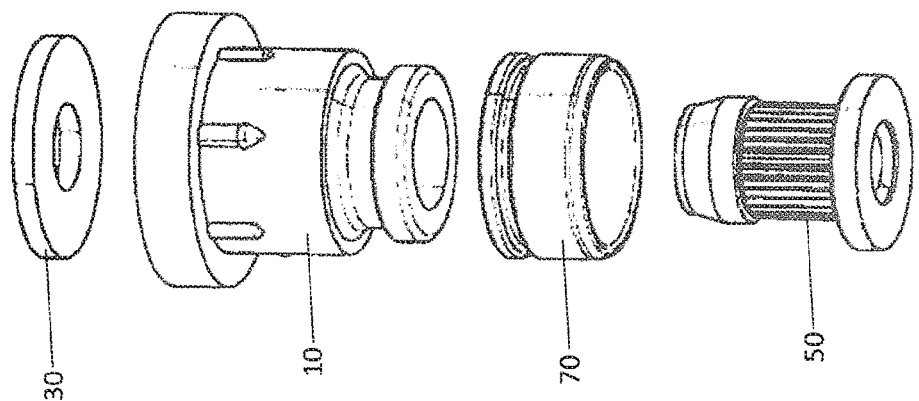
Figure 12:
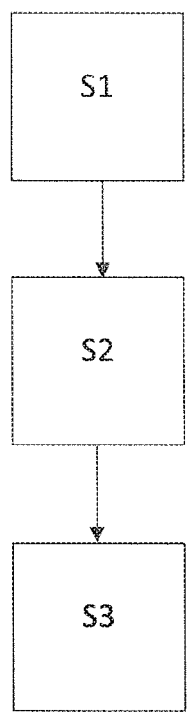
Figure 13:
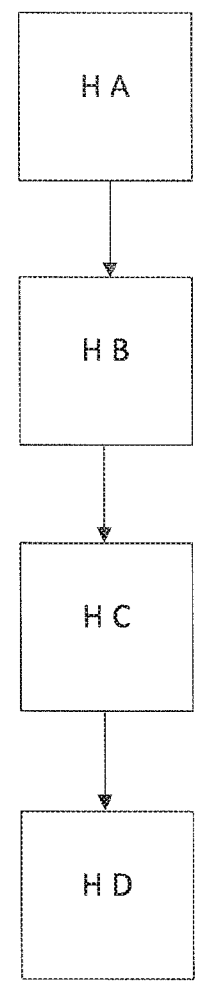
Figure 14:
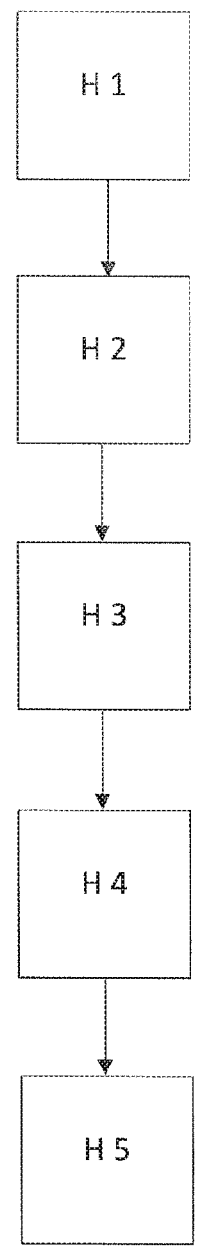
Figure 15:
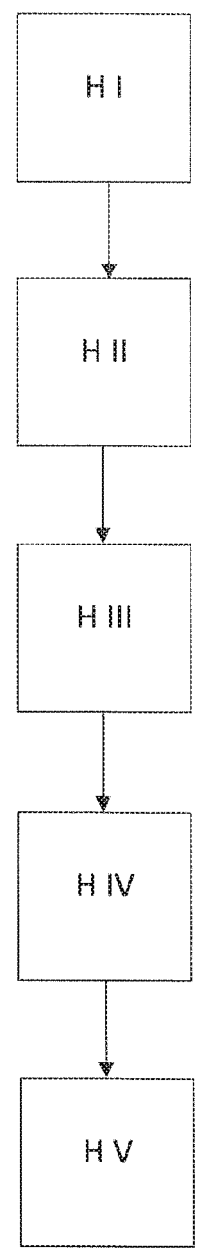

The embodiments of the present disclosure are explained in more detail with reference to the accompanying drawing. Showing:

FIG. 1 a side view of an embodiment of the blind rivet,

FIG. 2 a lateral sectional view of the blind rivet of FIG. 1,

FIG. 3 an embodiment of a connection of two components with the blind rivet,

FIG. 4 an exploded view of an embodiment of the blind rivet,

FIG. 5 a perspective view of the bushing and the distributor disc of the blind rivet, FIG. 6 a lateral sectional view of the bushing and the distributor disc of FIG. 5, FIG. 7 a perspective exploded view of the blind rivet with the bushing not yet inserted, FIG. 8 a perspective view of an embodiment of the blind rivet with the distributor disc not yet inserted, FIG. 9 a perspective view of an embodiment of the blind rivet, FIG. 10 another perspective view of the blind rivet according to FIG. 9, FIGS. 11a, 11b, 11c and 11d different sequences of an assembly of the blind rivet from its individual parts, FIG. 12 a flow chart of an embodiment of the connection method of the blind rivet, FIG. 13 a flow chart of a first embodiment of the manufacturing method of the blind rivet, FIG. 14 a flow chart of a second embodiment of the manufacturing method of the blind rivet, and FIG. 15 a flow chart of a third embodiment of the manufacturing method of the blind rivet.

DETAILED DESCRIPTION

In FIG. 1 a side view of the blind rivet 1 is shown. Correspondingly, FIG. 2 shows a lateral sectional view of the blind rivet 1 of FIG. 1. The section extends along the longitudinal axis of the blind rivet 1. FIG. 3 further illustrates an application of the blind rivet 1 for establishing a connection between a support component T and a fastening part B by means of a screw connection, as explained in more detail below.

The blind rivet 1 is made of an elastic outer body 10 with a sleeve-shaped shaft 12. The sleeve-shaped shaft 12 forms a foldable hollow-cylindrical folding zone due to its axial extension. Within the folding zone, an upsetting bulge 14 is formed during a connecting of the support component T and the fastening part B (see FIG. 3). This is supported on a side of the support component T.

Adjacent to the shaft 12, the outer body 10 is limited by a fastening flange 16. This extends radially beyond an outer diameter of the shaft 12. Thus the fastening flange 16 forms an abutment face or surface for the blind rivet 1 when the latter is arranged in a bore 91 of the support component T.

The fastening flange 16 may provide an inner space for receiving a distributor disc 30. The distributor disc 30 serves for support and load distribution in the connection (see FIG. 3) when a metal bushing 50 is supported at the distributor disc 30. The distributor disc 30 may be held loss-proof by an undercut in the axial direction on both sides in the fastening flange 16. It is of course also possible that the bushing 50 engages through the fastening flange 16 in a connection and is supported directly at fastening part B. Although this would limit the mechanical load transfer from the bushing 50 to the fastening part B to a smaller area or surface portion compared to the distributor disc 30, it would not impair the functionality of the blind rivet 1.

The outer body 10 may have a constant wall thickness in the cylindrical folding zone of the shaft 12. The wall thickness is selected in such a manner that it allows folding to an upsetting bulge 14 in the folding zone. At the same time, it also ensures a sufficiently strong upsetting bulge 14, which abuts against the support component T in the connection.

A likewise hollow-cylindrical retaining section 18 may adjoin the folding zone in the axial direction. The retaining section 18 has a radial inner side which may abut against a radial outer side of the metal bushing 50. The retaining section 18 and the metal bushing 50 may form a form-fit or positive connection or they form a form-fit and frictional connection in this portion in order to prevent the bushing 50 from rotating in the retaining section 18. The form-fit connection is supported by a longitudinal knurling 52 of the bushing 50, which is shown in FIG. 4.

The outer body 10 may have a continuous constant wall thickness in the portion of the shaft 12 and in the retaining section 18. It may also be preferred that an inner diameter of the retaining section 18 decreases compared to the shaft 12. As a result, it may be preferred that the retaining section 18 abuts against the bushing 50. In addition, at the radially inner transition between shaft 12 and retaining section 18, a step 19 directed radially inwards is created. The step 19 may form an axial undercut in order to retain the bushing 50 axially within the outer body 10.

According to another embodiment of the design or construction of the retaining section 18, the radial outer side comprises a circumferential indentation 20. This supports an engagement of a shape feature 72 of a fixing sleeve 70, so that a form-fit against an axial displacement of the fixing sleeve 70 and the bushing 50 may be provided.

Also, the indentation 20 may produce an approximately angular C-shaped course of the retaining section 18 as viewed in the cross-section of the outer body 10, wherein the C is open radially outwards. At the end axially opposite the fastening flange 16, the outer body 10 may end in an end flange 22. The end flange 22 may have a smaller outer diameter than the fastening flange 16. Nevertheless it provides a sufficiently large support face or surface 24 for a retaining flange 54 of the bushing 50.

When viewed in a lateral sectional view and in installation direction $R_I$, the bushing 50 is formed inversely T-shaped, as can be seen in FIG. 2, for example. The transversely extending section is formed by the ring-shaped circumferential retaining flange 54, which is supported at the end flange 22. The end flange 22 forms an axial undercut against an axial displacement of the bushing 50 in the outer body 10. In addition, this undercut ensures that at a screwing or screwing together of the blind rivet 1, an axial offset of the bushing 50 in installation direction $R_I$ is transferred via the retaining section 18 to the folding zone in the shaft 12. Since preferably the retaining section 18 does not deform axially, the offset of the bushing 50 in installation direction $R_I$ leads to the forming of the upsetting bulge 14.

Starting at the retaining flange 54, the bushing 50 extends in hollow-cylindrical form 56 with an inner thread 58 in installation direction $R_I$. In the portion of the retaining section 18, the radial outer side may comprise a recess 60, in which a radially inner step 26 of the retaining section 18 engages. In the axial direction, the recess 60 is limited on the one hand by the retaining flange 54 and on the other hand by an end step 64 of the conical end section 62. Thus, these two steps 54, 64 also serve to fix the axial position of the bushing 50 in the outer body 10.

The conical end section 62 reduces its wall thickness in the installation direction $R_I$ in order to end in an axial support surface 66. The support surface 66 may be configured to be supported in a load-bearing manner at the distributor disc 30 (see above).

During the establishing of a screw connection with the blind rivet 1, a threaded bolt is screwed into the inner thread 58 of the bushing 50. Alternatively to this, it may also be preferred that the threaded bolt is screwed into a female threaded element (not shown) axially adjacent to the blind rivet 1. During the screwing or screwing together, the bushing 50 is displaced in the installation direction $R_I$. Thereby the deformation and upsetting forces in the retaining section 18 are transferred from the bushing 50 to the outer body 10 and from there to the upsetting zone of the shaft 12.

In case of thermal and chemical loads on the outer body 10 or in case of highly deformable materials of the outer body 10, a secure retention of the outer body 10 on the axially offset bushing 50 is of importance. To ensure this, at least an axial subportion of the retaining section 18 is circumferentially enclosed by a fixing sleeve 70. An inner diameter of the fixing sleeve 70 may be selected such that a radial expansion of the outer body 10 in the retaining section 18 does not exceed the radial expansion of the retaining flange 54. Of course, within a certain tolerance range, the radial expansion of the retaining section 18 can exceed the outer diameter of the retaining flange 54. However, this can only be tolerated as long as the radial dimensioning of the fixing sleeve 70 and the retaining flange 54 prevents an axial detachment of the outer body 10 from the bushing 50 against the installation direction $R_I$. It therefore may be preferred that the fixing sleeve 70 limits the radial expansion of the outer body 10 to a maximum of the radial expansion of the retaining flange 54 of the bushing 50.

In order to support handling of the fixing sleeve 70, the latter may comprise a circumferential indentation 74. In addition, the indentation 74, which projects radially inwards into the outer body 10 similar to a radial web, provides support faces or surfaces for the outer body 10. This is because precisely in the case of an axial compression of the outer body 10 in a connection of the blind rivet 1, the outer body 10 may be supported both at the fixing sleeve 70 as well as at the bushing 50. In addition, the shape of the fixing sleeve 70 may also ensure a form-fit between fixing sleeve 70, outer body 10 and bushing 50. This form-fit prevents detachment of the fixing sleeve 70 from the outer body 10.

According to different construction alternatives of the blind rivet 1, the fixing sleeve 70 is made of plastic or metal or a composite material, such as fiber-reinforced plastic. Depending on the manufacturing method of the blind rivet 1, the fixing sleeve 70 is manufactured separately and then arranged on the outer body 10. It may also be preferred to inject the fixing sleeve 70 onto the outer body 10. This may be realized in separate injection molding methods or by means of other plastic processing methods or in a 2-component (2K) injection molding method.

The variability in the production of the blind rivet 1 also opens up a material variability for the outer body 10. Since the outer body 10 realizes a damping behavior in a connection of the blind rivet 1 and also resists external mechanical and/or chemical and/or thermal and/or other influences, the almost free choice of material is important for the realization of the outer body 10. This results from the above described construction of the blind rivet 1 and especially the fixing sleeve 70, which ensures the retention of the outer body 10 in the blind rivet construction.

The materials for the outer body 10 may include thermoplastic elastomers and silicones, which may be made of cross-linked polypropylene-ethylene-propylene-diene elastomer (EPDM-X+PP) with a temperature resistance for T<80° C., ethylene-propylene-diene elastomer (EPDM) with a temperature resistance for T<120° C. and polyvinylmethylsiloxane (VMQ) with a temperature resistance for T<150° C.

In order to create a connection between the support component T and a fastening part B, the blind rivet 1 is initially inserted into a bore 91 of the support component T (step S1). Any tolerances in the diameter of the bore 91 and in the outer diameter of the shaft 12 are compensated by webs 13 at the radial outer side of the shaft 12. The webs 13 may extend in the axial direction from the fastening flange 16 and protrude radially from the radially outer side of the shaft 12. Due to an elastic deformability the webs 13 compensate tolerances and are supported elastically deformed at the edge of the bore 91. In addition, the fastening flange 16 is supported on the side of the support component T facing the fastening part B.

Next, the component B is aligned with a bore 93 to the central opening in the blind rivet 1 and arranged at the fastening flange 16 (step S2). A fastening screw S now passes through both bores 91, 93 and is screwed into the inner thread 58 of the bushing 50 or into another female threaded element (not shown) (step S3). During the screwing-in, the blind rivet 1 is compressed in axial direction and the fastening part B and the support component T are displaced towards each other. Due to the axial compression of the blind rivet 1, the shaft 12 is upset and the upsetting bulge 14 is formed. The upsetting bulge 14 abuts against the support component T. On the opposite side of the support component T the fastening flange 16 is supported, which in turn is engaged by the fastening part B.

During the upsetting process, the bushing 50 is moved in the direction of the fastening part B until it may engage the distributor disc 30 in a load-transferring manner. At this, the fixing sleeve 70 firmly retains the outer body 10 at the retaining section 18 on the hollow-cylindrical section 56 of the bushing 50, so that the outer body 10 cannot slide over the retaining flange 54.

In order to stabilize the abutment of the bushing 50 at the distributor disc 30, the bushing 50 and/or the distributor disc 30 may be profiled in the contact portion. This is illustrated in FIGS. 5 and 6 in a further embodiment. According to one design alternative, the distributor disc 30 has a flat knurling 32. This may extend in a radial direction in order to realize a rotation inhibition in case of an engagement or abutment of the support surface 66 of the bushing 50. It also may be preferred that the support surface 66 is toothed or profiled in order to ensure a positional stability between the distributor disc 30 and the bushing 50.

The blind rivet 1 may be manufactured according to different manufacturing routes. The starting point is initially the production or, more generally, the providing of the metal bushing 50, such as by cold forming or similar known methods (H1). The distributor disc 30 is also manufactured from metal using known methods.

According to a first manufacturing route (FIG. 13), the bushing 50 together with the fixing sleeve 70 are arranged coaxially to each other in an injection mold (step H A). The arrangement may be chosen in such a manner that a plastic with the desired material properties (see above) is injected between the bushing 50 and the fixing sleeve 70 to produce the outer body 10 (step H B). For this, the injection mold predefines the complementary shape of the outer body 10 according to the above description, so that the outer body 10 is formed by the injected plastic. After the demolding of the outer body 10 from the injection mold (step H C), the combination of outer body 10, fixing sleeve 70 and bushing 50 is thus present. It is understood that the demolded outer body 10 has a free central passage opening.

Finally, the distributor disc 30 may be arranged loss-proof in the fastening flange 16 (step H D).

An alternative manufacturing route is shown in FIG. 14 in steps 1 to 4. This manufacturing route starts from the already provided individual parts bushing 50, outer body 10, fixing sleeve 70 and distributor disc 30 of the blind rivet 1, which are then assembled. At first, the fixing sleeve 70 may be arranged on the retaining section 18. The arrangement can be supported by a positive fit or form-fit between outer body 10 and fixing sleeve 70, but this is only optional (step 2). The fixing sleeve 70 may be made of metal, plastic or a composite material. The bushing 50 is then inserted with the conical end section 62 first into the axial end of the outer body 10 (step H3), which is facing away from the fastening flange 16. Due to the elasticity of the material of the outer body 10, the conical end section 62 is forced into the outer body 10 until the retaining section 18 abuts against the hollow-cylindrical section 56. In this position, the retaining flange 54 may be supported at the axial end of the outer body 10. In addition, the fixing sleeve 70 may support a frictional connection between bushing 50 and outer body 10. Alternatively, it may be preferred to first insert the bushing 50 into the outer body 10 (step H3) and only then arrange the fixing sleeve 70 on the outer body 10 (step H 4). Finally, the distributor disc 30 is arranged in the fastening flange 16 (step H5).

According to another manufacturing alternative (FIG. 15), the fixing sleeve 70 is arranged in the injection mold (step H I). The arrangement may be chosen in such a manner that to produce the outer body 10 a plastic with the desired material properties (see above) is injected into the fixing sleeve 70 (step H II). The injection mold predefines the complementary shape of the outer body 10 according to the above description, so that the outer body 10 is formed by the injected plastic. After the demolding of the outer body 10 from the injection mold (step H III), the combination of outer body 10 and surrounding fixing sleeve 70 is present. It is understood that the demolded outer body 10 has a free central passage opening. Subsequently, the metal bushing 50 may be inserted into the combination of outer body 10 and fixing sleeve 70 (step H IV), so that the construction of the blind rivet 1 already described above results.

Finally, the distributor disc 30 may be arranged loss-proof in the fastening flange 16 (step H V).

The invention claimed is:

1. Blind rivet for a screw connection, comprising the following features:
   a. an elastic outer body with a sleeve-shaped shaft which comprises a fastening flange and a hollow cylindrical folding zone which is foldable to an upsetting bulge, so that a support component is supportable between the fastening flange and the upsetting bulge,
   b. a metal bushing which is arranged within the outer body and which comprises a support section arranged in the portion of the folding zone, which is longitudinally displaceable relative to the outer body and is axially limited at an axial end facing away from the support section by a ring-shaped retaining flange which covers a radial expansion of the outer body, and
   c. a fixing sleeve surrounding the outer body, which is arranged adjacent to the retaining flange of the bushing extends axially in the direction of the fastening flange and limits a radial expansion of the outer body outside the folding zone as well as between bushing and fixing sleeve to at most the radial expansion of the retaining flange of the bushing.

2. Blind rivet according to claim 1, in which the retaining flange completely covers the radial expansion of the outer body.

3. Blind rivet according to claim 1, in which an axial length of the fixing sleeve limits an axial length of the folding zone without supporting the folding zone by a tapering of a wall thickness of the outer body.

4. Blind rivet according to claim 1, in which the outer body comprises a fastening flange which provides a receiving space for a distributor disc.

5. Blind rivet according to claim 4, in the fastening flange of which the distributor disc is held in a loss-proof manner, which preferably has a knurling at a side facing the bushing.

6. Blind rivet according to claim 1, in which the bushing comprises a conical end section facing the fastening flange, wherein the conical end section provides an axial support surface and an axial undercut.

7. Blind rivet according to claim 6, which has a knurling at the axial support surface as an anti-rotation protection.

8. Blind rivet according to claim 1, in which the fixing sleeve comprises a circumferential indentation which supports a positive fit between the outer body and the bushing.

9. Blind rivet according to claim 1, in which the bushing comprises at a radial outer side an anti-rotation protection in the form of longitudinal knurls which are arranged outside the folding zone.

10. Blind rivet according to claim 1, in which, below the fastening flange of the outer body, circumferentially distributed webs are provided for firmly clamping the outer body in a bore of a support part.

11. Blind rivet according to claim 1, in which the bushing is formed as a threaded bushing with an inner thread for receiving a fastening screw, so that the blind rivet serves as a blind rivet nut.

12. Blind rivet according to claim 1, in which the bushing is formed threadless.

13. Blind rivet according to claim 1, in which the outer body is made of a polyester-based thermoplastic elastomer or a cross-linked elastomer with good chemical resistance and/or thermal stability or of a silicone.

14. Blind rivet according to claim 13, in which the polyester-based elastomer is a polybutylene terephthalate (PBT) or polyethylene terephthalate (PET) or a cross-linked polypropylene-ethylene-propylene-diene elastomer (EPDM-X+PP) or an ethylene-propylene-diene elastomer (EPDM) and the silicone is a polyvinylmethylsiloxane (VMQ).

15. Connection method for a screw connection between a support component and a fastening part, comprising the following steps:
   a. inserting the blind rivet according to claim 1, into a bore in the support component,
   b. arranging the fastening part with an opening adjacent to the fastening flange of the outer body and
   c. screwing a fastening screw into the blind rivet, wherein the outer body is folded in a folding zone in such a manner that the fastening flange and a folding bulge are supported on opposite sides of the support component when the support component and the fastening part are fastened to each other.

16. Connection method according to claim 15, in which the fastening screw is screwed into an inner thread of the bushing of the blind rivet or into another female threaded element.

17. Connection between a support component and a fastening part which are fastened to each other by means of a screw connection using a blind rivet according to claim 1.

* * * * *